Feb. 12, 1924.

C. A. HENDRIX 1,483,806

ELECTRICAL SCOREBOARD

Filed Oct. 13, 1922    6 Sheets-Sheet 1

Feb. 12, 1924.

C. A. HENDRIX 1,483,806

ELECTRICAL SCOREBOARD

Filed Oct. 13, 1922    6 Sheets-Sheet 2

WITNESS:

C. A. Hendrix
INVENTOR
BY Victor J. Evans
ATTORNEY

Feb. 12, 1924.
1,483,806
C. A. HENDRIX
ELECTRICAL SCOREBOARD
Filed Oct. 13, 1922     6 Sheets-Sheet 3

C. A. Hendrix, INVENTOR
BY Victor J. Evans, ATTORNEY

WITNESS:

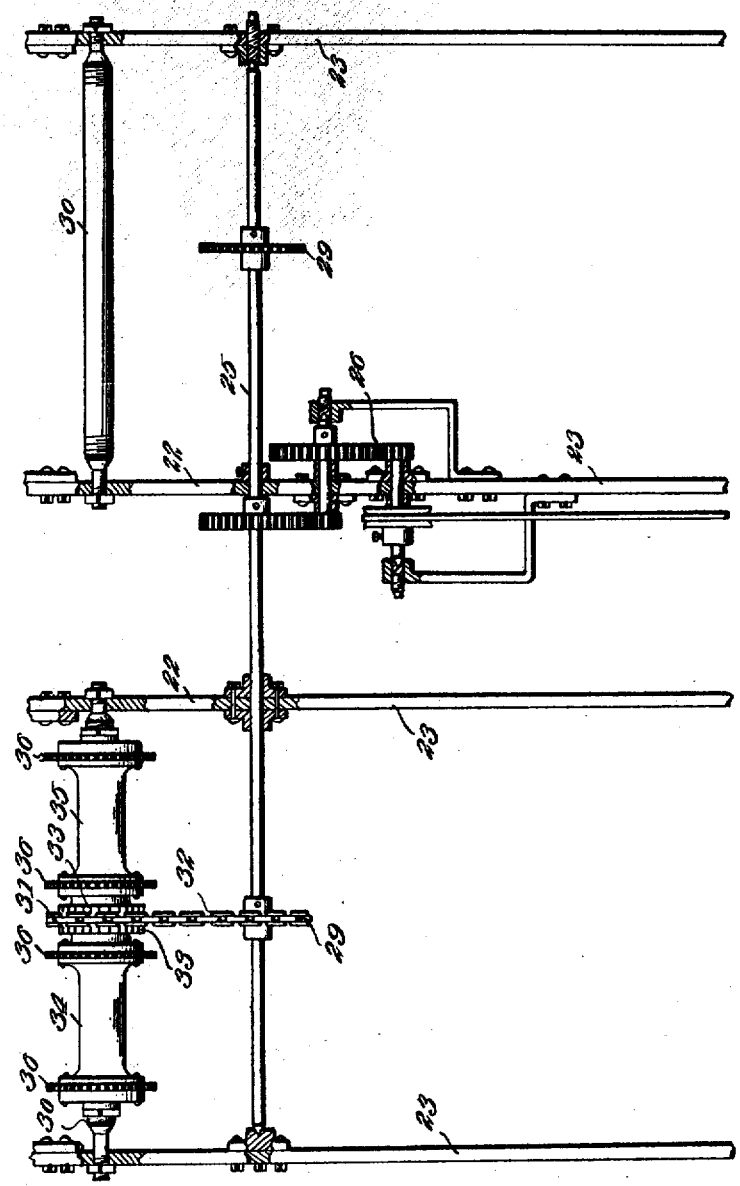

Feb. 12, 1924.                                                1,483,806
                      C. A. HENDRIX
                   ELECTRICAL SCOREBOARD
              Filed Oct. 13, 1922        6 Sheets-Sheet 5
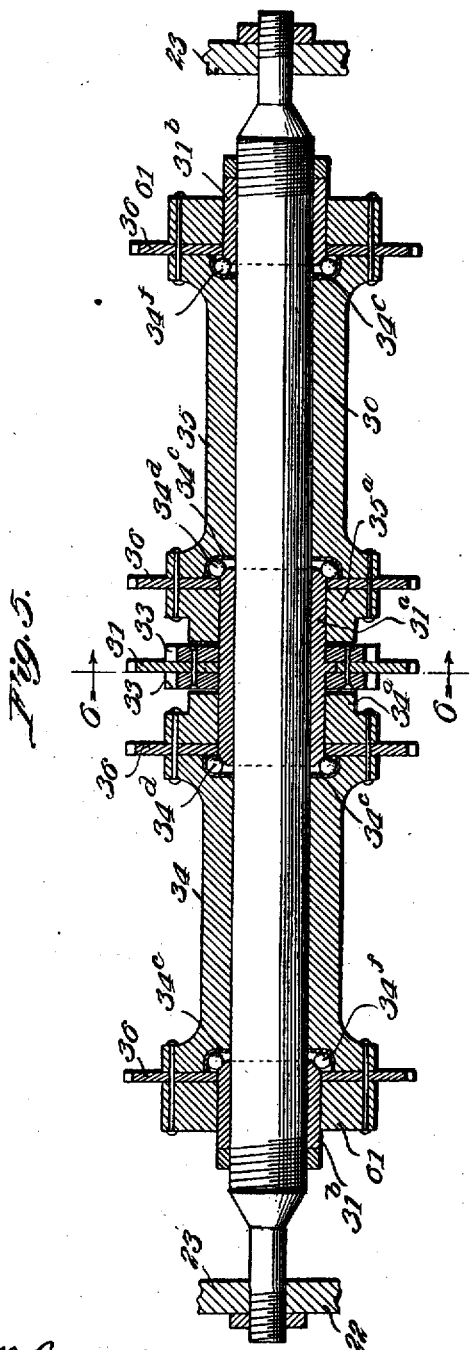
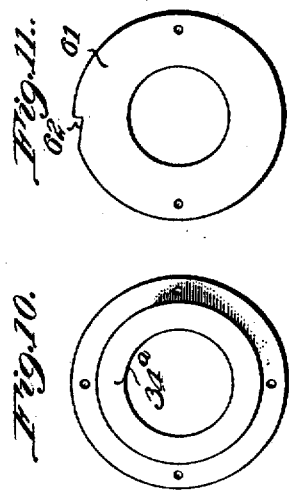
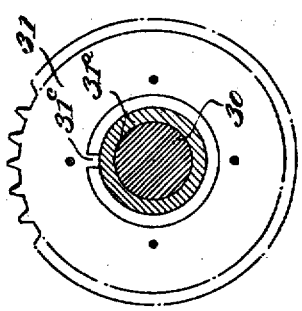

Feb. 12, 1924.
C. A. HENDRIX
ELECTRICAL SCOREBOARD
Filed Oct. 13, 1922
1,483,806
6 Sheets-Sheet 6
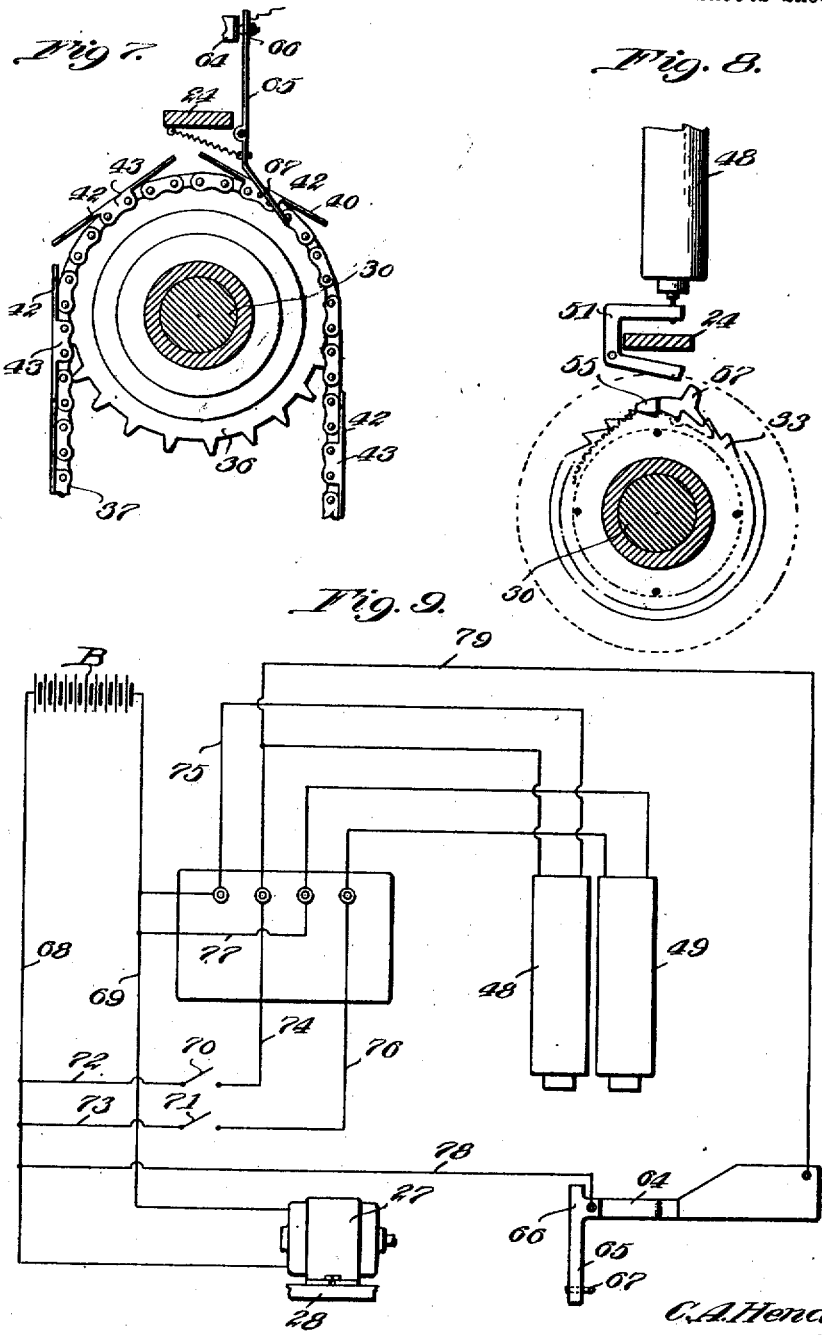

Patented Feb. 12, 1924.

1,483,806

UNITED STATES PATENT OFFICE.

CECIL A. HENDRIX, OF FLORA, INDIANA.

ELECTRICAL SCOREBOARD.

Application filed October 13, 1922. Serial No. 594,354.

*To all whom it may concern:*

Be it known that I, CECIL A. HENDRIX, a citizen of the United States, residing at Flora, in the county of Carroll and State of Indiana, have invented new and useful Improvements in Electrical Scoreboards, of which the following is a specification.

This invention relates to indicators, particularly to score boards, and has for its object the provision of a novel electrically operated and controlled device for indicating the score of a basket ball game, the device being however capable of use in keeping score of other games, no limitation being present in this connection.

An important object is the provision of an electrically operated device of this character which includes endless members carrying plates bearing numerals, the endless members being selectively driven by a motor mechanism for displaying the desired numerals through a sight opening, a feature being that two sets of endless members are provided which carry plates bearing "units" numerals and other plates bearing "tens" numerals.

An important object is the provision of control means whereby either set of endless members may be driven for changing the number displayed through the sight opening, means being also provided for automatically tripping the control means of the "tens" numerals when the endless member of the "units" series has completed a full circuit.

A further object is the provision of a device of this character in which the mechanism is of twin formation and arrangement so that the score of the home team and the visiting team will be displayed, the various scores being of course separately operated.

An additional object is the provision of a device of this character which will be comparatively simple and inexpensive in manufacture, efficient for its specific purpose, which will be efficient and durable in service and a general improvement in the art.

With the above and other objects and advantages in view the invention consists in the details of construction to be hereinafter more fully described and claimed and illustrated in the accompanying drawings, in which:

Figure 1:
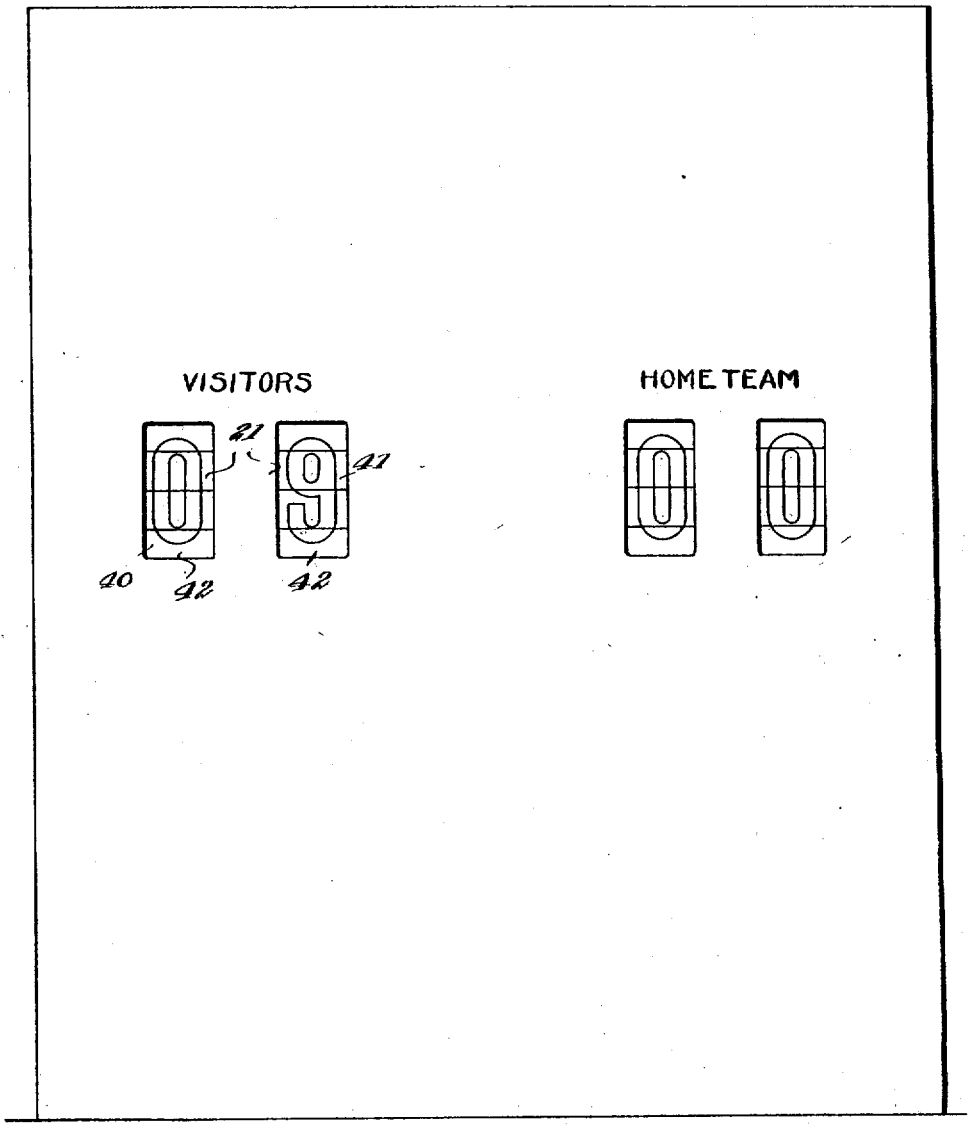
Figure 1 is a front elevation of the device.
Figure 2:
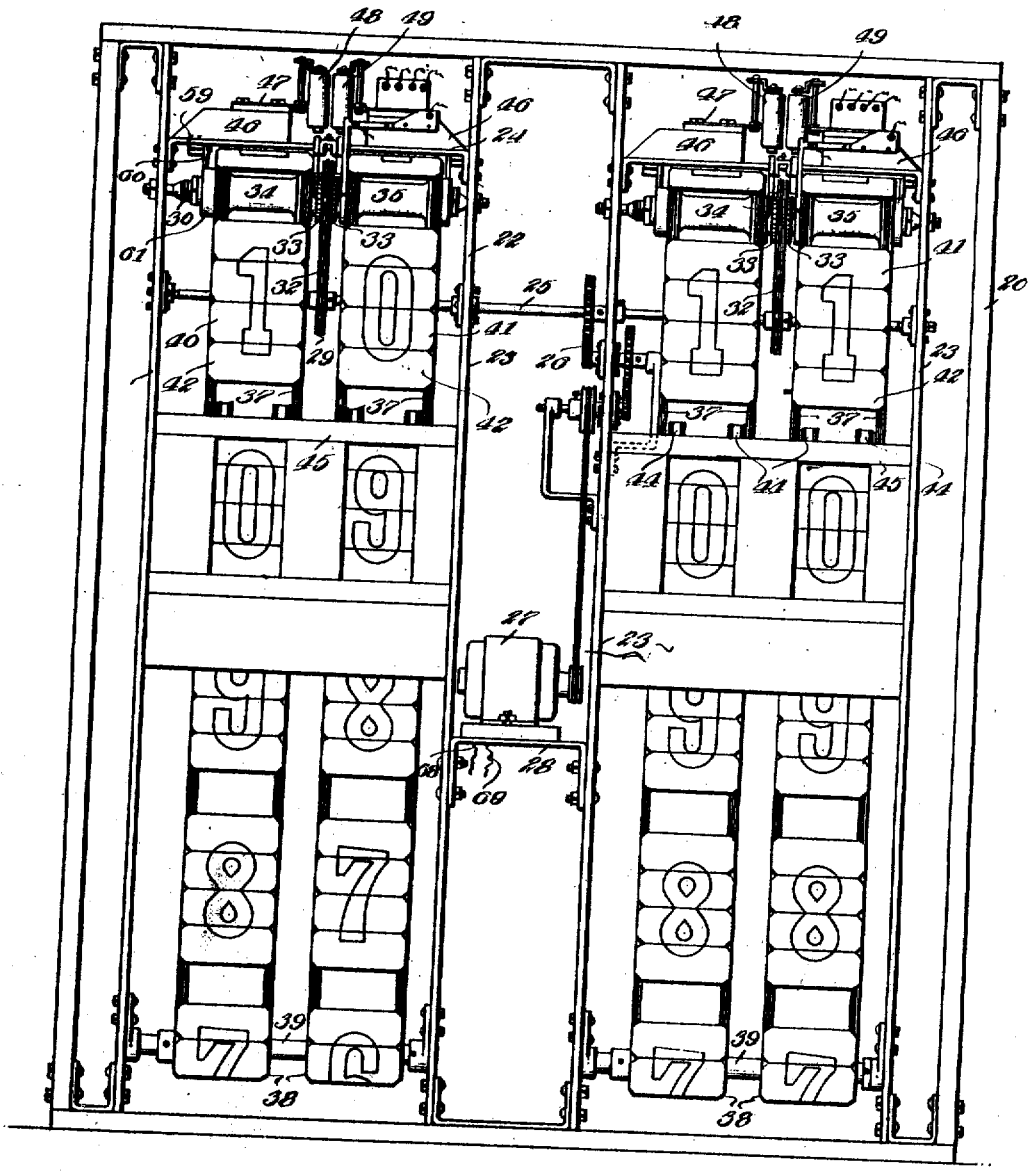
Figure 2 is a front elevation of the entire mechanism contained in the casing.
Figure 3:
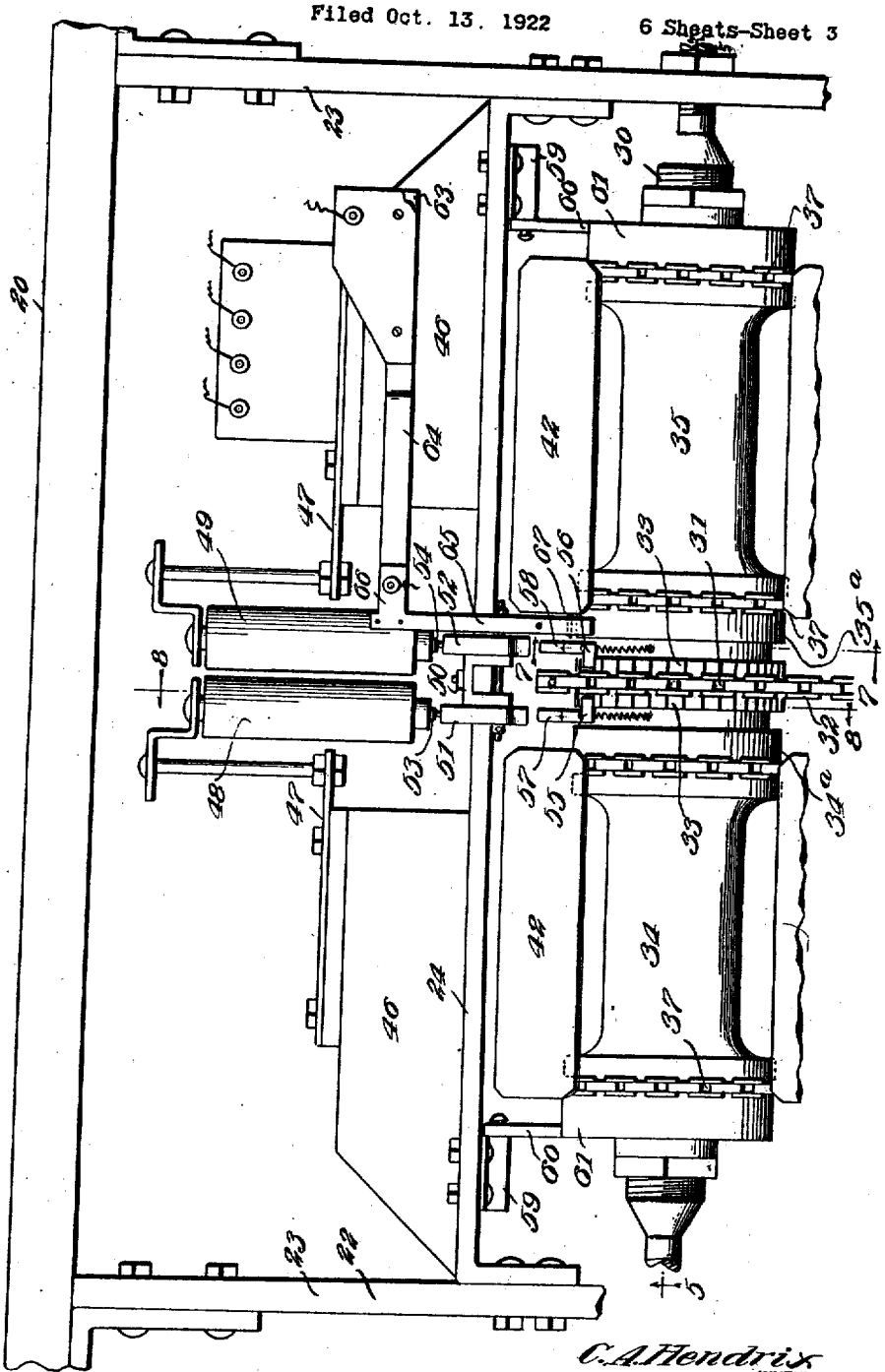

Figure 3 is an enlarged elevation of the mechanism at the top of the endless members, Figure 4 is an enlarged rear elevation of the gearing, Figure 5 is a longitudinal section showing the drive for the endless members, the section being taken on the line 5—5 of Figure 3, Figure 6 is a vertical section on the line 6—6 of Figure 5, Figure 7 is a vertical section showing one of the endless members carrying sprockets, the section being taken on the line 7—7 of Figure 3, Figure 8 is a cross sectional view taken on the line 8—8 of Figure 3, showing the trip mechanism, Figure 9 is a diagram of the electric circuit, Figure 10 is a detail view of a pawl carrying collar, Figure 11 is a detail view of a notched collar.

Referring more particularly to the drawings I have shown the entire mechanism to be described as enclosed within a suitable, preferably rectangular casing 20 which may be constructed of any suitable material and which may have its face divided into panels for bearing any desired advertising matter. The front of this casing is formed with sight openings 21 above two of which is inscribed the word "Visitors" and above the other two of which is inscribed the legend "Home team." Any suitable means may be provided for supporting this casing from the ground or suspending it or for securing it against a wall or the like. These details are not illustrated as they are not important.

Mounted within the casing 20 is a supporting frame 22 which carries all the mechanism to be described and which includes upright side members 23 and a top cross member 24. Journaled through the frame is a horizontal drive shaft 25 which is driven by a train of gears 26 operated by an electric motor 27 which is mounted on any suitable bracket structure 28 carried by the frame. Intermediate its ends the shaft 25 carries a sprocket 29.

Secured to the frame above the shaft 25 but below the upper cross member 24 is a shaft 30 upon which is a rotatable sprocket 31 about which is trained a chain 32 which is, in turn, trained about the sprocket 29 so that the sprocket 31 will be constantly rotated while the motor is in operation. Carried by this sprocket 31 at opposite sides thereof are ratchets 33 for a purpose to be described. Rotatable upon the shaft 30 are two sleeves or rollers 34 and 35 having their ends provided with sprockets 36 about which are trained endless chains 37 which extend downwardly and which are trained about idler sprockets 38 rotatable on a shaft 39 located at the lower end of the frame. Disposed against the confronting faces of the innermost sprockets 36 and secured thereto and to the inner ends of the sleeves 34 and 35 are collars $34^a$ and $35^a$ respectively. Disposed against the outer sides of the outer most sprockets 36 are other collars 61 which are secured, as by rivets or the like to the sprockets and also to the outer ends of the sleeves.

Surrounding the central portion of the shaft 30 is a sleeve $31^a$ upon which the sprocket 31 and ratchets 33 carried thereby turn and which has its ends extending through the collars $34^a$ and $35^a$ and also through the inner sprockets 36. The inner ends of the sleeves 34 and 35 are recessed and carry ball races $34^c$ within which are located bearing balls $34^d$ which ride upon the ends of the sleeve $31^a$. Mounted upon the outer ends of the shaft 30 are sleeves $31^b$ which extend through the collars 61 and outer sprockets 36. The outer ends of the sleeves 34 and 35 are formed with recesses within which are located ball races $34^e$ within which travel bearing balls $34^f$ riding on the inner ends of the sleeves $31^b$. The purpose of providing these sleeves $31^a$ and $31^b$ and the ball races and balls therein is to insure easy running by reducing friction to the minimum.

The indicating means comprises a plurality of panels 40 and 41 bearing numerals ranging from "1" to "0." Each panel consists of a plurality of plates 42 so that the panels may pass about the sprocket carrying sleeves without binding. The connection of these plates with the chains 37 might of course vary though in actual practice I prefer to form the plates 42 at their ends with link elements 43 which are interposed in and which thus form part of the chains 37.

At the sides of the sight openings 21 in the casing I provide alignment guides which consists of channel bars 44 along which the panels slide and which operate to hold the plates forming the panel in proper position to make an attractive appearance when viewed by the spectators. It is intended that these plates 42 be carefully made so that the joints between them will not be visible at a casual glance. These channel-bars 44 are carried by suitable supporting bars 45 secured to the frame as shown.

Mounted upon the upper cross member 24 are supports 46 upon which are mounted brackets 47 carrying a pair of electromagnets 48 and 49. Mounted on the cross member 24 is a block 50 on which are pivoted U-shaped trips 51 and 52 carrying armatures 53 and 54 respectively positioned below the cores of the magnets 48 and 49 respectively. The mounting of these trips is such that the upper arms thereof will be disposed above the cross member 24 and the lower arms below the same. Pivoted upon the collars $34^a$ and $35^a$ are spring pressed pawls 55 and 56 co-operating with the ratchets 33 and respectively formed with lugs 57 and 58 normally engaging against the trips 51 and 52 for holding them out of engagement with the adjacent ratchets 33.

Carried by the outer ends of the supports 46 are brackets 59 upon which are pivoted spring pressed pawls 60 which ride against the peripheries of the collars 61 on the outer ends of the sleeve members 34 and 35 and which are adapted to engage within notches 62 in these collars for preventing retrograde movement of the sleeves.

The automatic trip mechanism consists of a block of insulating material 63 carried by one of the supports 46 and to which is secured an elongated spring contact 64. Pivoted on the block 50 is a trip lever 65 which has one end carrying an insulated contact 66 normally out of engagement with the contact 64 but movable there against when the endless chain mechanism carrying the "units" numerals has made a complete circuit. Carried by one lower corner of the panel which bears the "units" numeral "1" is a lug or projection 67 which is engageable with the trip lever 65 and which swings the same to bring the contact 66 against the contact 64.

The above described mechanism is constructed in duplicate, one unit being for the score of the home team and the other for the score of the visiting team. There must of necessity be two frames 22 each of which carries all the mechanism above described, except that there is only one motor. The shaft 25 extends through and is common to both frames. The two shafts 30 are separate.

To effect the control I provide a suitable source of current, such as a battery B from which lead feed wires 68 and 69 which are connected with the motor, any suitable control switch being provided for breaking the circuit to the motor when desired. I also provide, for each unit of the device, push buttons 70 and 71 which are connected by wires 72 and 73 with the wire 68. Also connected with the push button 70 is a wire 74 which leads to one terminal of the electromagnet 48 the other terminal of which is connected with a wire 75 which is connected with the wire 69. Connected with the push button 71 is a wire 76 which leads to one terminal of the electromagnet 49 which has its other terminal connected by a wire 77 with the wire 69. Connected with the wire 68 is a wire 78 which is connected with the contact 66 and connected with the contact 64 is a wire 79 which is connected with the wire 74 so that engagement of the contacts 64 and 66 will have the same effect as pushing the push button 70.

The operation is as follows: Initially all the endless chains 37 are in such position that the zero panels will be opposite the sight openings 21. When a team makes a score, the operator presses the push button 71 whereupon current will flow from the wire 68, through the push button structure, wire 76, electromagnet 49 and wire 77 back to the other feed wire 69. This will result in energization of the magnet 49 and this magnet will attract the armature carried by the trip 52 and move this trip out of the path of travel of the pawl 56. The pawl will then engage the adjacent ratchet 33 carried by the driven sprocket 31. As the motor is constantly rotating and the sprocket 31 and the ratchets 33 and 33 also constantly rotating, the movement of the sprocket 31 and ratchets 33 and 33 will be imparted to the pawl 56 and collar 35ª and consequently the sleeve 35 and sprockets 36 thereon. This will result in driving the chains 37 which carry the numerals of the units series. As soon as pressure upon the push button 71 is released, the trip 52 will drop and will be engaged by the pawl 56 when the sleeve 35 has made a complete revolution, sufficient to move the next numeral panel into position. If the push button is held down the endless chains 37 will be moved as much as desired to display any selected numeral through the proper one of the sight openings 21. Movement of the chains carrying the "tens" panels is effected in the same way by pressing upon the push button 70, the trip 51 being raised to permit the pawl 55 to drop into engagement with the adjacent ratchet 33 so that the sleeve 34 and chains carried thereby will be moved. The degree of movement of all the chains is controlled of course by the length of time that the push buttons are held in circuit closing position. The operation of the alignment guides has already been explained and a repetition is unnecessary. It should be mentioned that the pawls 60 co-operating with the notches 62 in the collars 61 operate to prevent retrograde movement of the sleeves.

A very important feature is the automatic trip mechanism comprised by the parts 63 to 67. When the chains carrying the panels of the "units" series have made a complete circuit the lug 67 on the panel carrying the numeral "1" will engage the lever 65 and swing it so that the contact 66 will engage the contact 64. When this occurs it is the equivalent of pressing the push button 70 and current will flow from the wire 68, contact 66, contact 64, wire 79, wire 74, magnet 48 and wire 75 to the wire 69. This causes energization of the magnet 48 and upward movement of the trip 51 just as if the push button 70 had been pressed. The effect of this is to move the chains of the "tens" series one step when the chains of the "units" series have moved through a complete circuit. To effect resetting the operator presses the push button 71 and holds it down until the same numeral of the "units" series is displayed as on the "tens" series. Both push buttons are then depressed and both sets of chains will be driven until the zero panels are in back of the sight openings. Corrections in the score are made in a similar manner and this operation requires no description.

From the foregoing description and a study of the drawings it will be apparent that I have thus provided a very easily constructed and readily controlled electric operated score board adaptable for indicating the score of various games, particularly basket ball. Ample provision has been made to take care of correcting errors, resetting the mechanism and other contingencies which might arise and the construction and operation are so simple that there is little to get out of order so that the device should have a long life.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A score indicator comprising a casing formed with sight openings, a pair of endless indicator members mounted within the casing and traveling behind said sight openings, drive members for said endless members carrying ratchets, elements about which said endless members are trained carrying pawls pivoted thereon and co-operating with the adjacent ratchets, and electromagnetically operated trip mechanism associated with each pawl whereby to control the position thereof.

2. A score indicator comprising a casing formed with sight openings, a pair of endless indicator members mounted within the casing and traveling behind said sight openings, drive members for said endless members carrying ratchets, elements about which said endless members are trained carrying pawls pivoted thereon and co-operating with the adjacent ratchets, electromagnetically operated trip mechanism associated with each pawl whereby to control the position thereof, the electromagnets being included in circuit with a source of current, and a circuit maker and braker interposed in the circuit and operated by movement of one endless member through a complete circuit whereby to move the other endless member one step.

3. A score indicator comprising a casing formed with sight openings, a pair of endless indicator members mounted within the casing and traveling behind said sight openings, drive members for said endless members carrying ratchets, elements about which said endless members are trained carrying pawls pivoted thereon and co-operating with the adjacent ratchets, electromagnetically operated trip mechanism associated with each pawl whereby to control the position thereof, the trip mechanism including extensions on said pawls, springs normally holding the pawls in engagement with the respective ratchets, trip elements pivoted on the respective frames and located in the path of travel of said extensions, armatures on said trip elements and electromagnets positioned to attract said armatures.

4. A score board comprising a casing formed with sight openings, a pair of frames within the casing, a drive shaft journaled through both frames, means for applying power to said shaft, a stationary shaft extending through each frame, two pairs of sleeves rotatably mounted on each stationary shaft, sprockets carried by said sleeves, endless members trained about said sprockets and about idler elements, numeral bearing panels carried by the respective endless members and adapted to be brought into registration selectively with the sight openings, means for driving a selected sleeve to the desired extent, said means consisting of a sprocket rotatable upon each stationary shaft between the sleeves thereon and carrying ratchets at each side, pawls pivoted upon the adjacent ends of each pair of sleeves and normally engaging the adjacent ratchets, trip means selectively operable for withdrawing the pawls from engagement with the ratchets, said trip means being electromagnetically operated, and means on one endless member for moving the other one step upon the completion of a circuit.

5. A score indicator comprising a casing formed with sight openings, two frames within the casing, a drive shaft journaled through both frames and carrying two sprockets, a stationary shaft carried by each frame, a pair of sleeves rotatable upon each stationary shaft and carrying sprockets about which are trained endless members carrying numeral bearing panels, idlers about which the endless members are trained, sprockets rotatable upon these stationary shafts and between the pair of sleeves thereon and carrying ratchets at each side, chains trained about said first and last named sprockets, pawls pivoted upon the adjacent ends of each pair of sleeves and co-operating with the adjacent ratchets, the panels on one set of endless members designating units and the panels on the other set designating tens, electromagnetically operated trip mechanism associated with each pawl whereby to control the position thereof and means on one endless member for moving the other one step upon the completion of a circuit.

6. A score indicator comprising a casing formed with sight openings, two frames within the casing, a drive shaft journaled through both frames and carrying two sprockets, a stationary shaft carried by each frame, a pair of sleeves rotatable upon each stationary shaft and carrying sprockets about which are trained endless members carrying numeral bearing panels, idlers about which the endless members are trained, sprockets rotatable upon these stationary shafts and between the pair of sleeves thereon and carrying ratchets at each side, chains trained about said first and last named sprockets, pawls pivoted upon the adjacent ends of each pair of sleeves and co-operating with the adjacent ratchets, the panels on one set of endless members designating units and the panels on the other set designating tens, electromagnetically operated trip mechanism associated with each pawl whereby to control the position thereof, said trip mechanism consisting of extensions on the pawls, trip elements pivoted upon the respective frames and normally engaging said extensions, and electromagnets positioned to attract said trip elements when energized, and interengaging means on both endless members whereby the tens indicating member will be moved one step upon completion of a full circuit by the unit member.

7. A score indicator comprising a casing formed with sight openings, two frames within the casing, a drive shaft journaled through both frames and carrying two sprockets, a stationary shaft carried by each frame, a pair of sleeves rotatable upon each stationary shaft and carrying sprockets about which are trained endless members carrying numeral bearing panels, idlers about which the endless members are trained, sprockets rotatable upon these stationary shafts and between the pair of sleeves thereon and carrying ratchets at each side, chains trained about said first and last named sprockets, pawls pivoted upon the adjacent ends of each pair of sleeves and co-operating with the adjacent ratchets, the panels on one set of endless members designating units and the panels on the other set designating tens, and electromagnetically operated trip mechanism associated with each pawl whereby to control the position thereof, the electromagnets being included in circuit with a source of current, and a circuit maker and breaker interposed in the circuit and operated by movement of the units chains through a complete circuit whereby to move the chains of the tens series one step.

8. A score indicator comprising a casing formed with sight openings, two frames within the casing, a drive shaft journaled through both frames and carrying two sprockets, a stationary shaft carried by each frame, a pair of sleeves rotatable upon each stationary shaft and carrying sprockets about which are trained endless members carrying numeral bearing panels, idlers about which the endless members are trained, sprockets rotatable upon these stationary shafts and between the pair of sleeves thereon and carrying ratchets at each side, chains trained about said first and last named sprockets, pawls pivoted upon the adjacent ends of each pair of sleeves and co-operating with the adjacent ratchets, the panels on one set of endless members designating units and the panels on the other set designating tens, and electromagnetically operated trip mechanism associated with each pawl whereby to control the position thereof, the trip mechanism consisting of extensions on said pawls, springs normally holding the pawls engaging the respective ratchets, trip elements pivoted on the respective frames and located in the path of travel of said extensions, armatures on said trip elements, electromagnets positioned to attract said armatures, and a circuit maker and breaker interposed in the circuit and operated upon completion of a complete circuit of the unit chain whereby to move the chain of the tens series one step.

9. A score indicator comprising a casing formed with sight openings, two frames within the casing, a drive shaft journaled through both frames and carrying two sprockets, a stationary shaft carried by each frame, a pair of sleeves rotatable upon each stationary shaft and carrying sprockets about which are trained endless members carrying numeral bearing panels, idlers about which the endless members are trained, sprockets rotatable upon these stationary shafts and between the pair of sleeves thereon and carrying ratchets at each side, chains trained about said first and last named sprockets, pawls pivoted upon the adjacent ends of each pair of sleeves and co-operating with the adjacent ratchets, the panels on one set of endless members designating units and the panels on the other set designating tens, and electromagnetically operated trip mechanism associated with each pawl whereby to control the position thereof, the trip mechanism consisting of extensions on said pawls, springs normally holding the pawls engaging the respective ratchets, trip elements pivoted on the respective frames and located in the path of travel of said extensions, armatures on said trip elements, and electromagnets positioned to attract said armatures, a pivoted lever carrying a contact, a stationary contact normally out of engagement with said contact, said electromagnets and said contacts being in circuit with a source of current and control switches, and a projection on one panel of the units series engageable with said lever whereby to bring said contacts into engagement for closing the circuit through the electromagnets controlling the tens series whereby to effect movement thereof one step.

In testimony whereof I affix my signature.

CECIL A. HENDRIX.